(12) United States Patent
Hellman et al.

(10) Patent No.: US 12,352,968 B2
(45) Date of Patent: Jul. 8, 2025

(54) WAVEGUIDE FOR ANGULAR SPACE LIGHT MODULATOR DISPLAY

(71) Applicant: Arizona Board of Regents on Behalf of the University of Arizona, Tucson, AZ (US)

(72) Inventors: Brandon Hellman, Tucson, AZ (US); Yuzuru Takashima, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 550 days.

(21) Appl. No.: 17/631,713

(22) PCT Filed: Jul. 31, 2020

(86) PCT No.: PCT/US2020/044395
§ 371 (c)(1),
(2) Date: Jan. 31, 2022

(87) PCT Pub. No.: WO2021/022106
PCT Pub. Date: Feb. 4, 2021

(65) Prior Publication Data
US 2022/0269086 A1 Aug. 25, 2022

Related U.S. Application Data

(60) Provisional application No. 62/880,730, filed on Jul. 31, 2019.

(51) Int. Cl.
*G02B 27/01* (2006.01)
*G03B 21/00* (2006.01)
*H04N 9/31* (2006.01)

(52) U.S. Cl.
CPC ....... *G02B 27/0172* (2013.01); *H04N 9/3152* (2013.01); *H04N 9/3161* (2013.01); *G02B 2027/0174* (2013.01)

(58) Field of Classification Search
CPC .............. G02B 27/0172; G02B 27/017; G02B 2027/0178; G02B 2027/0174; G02B 2027/0123; G03B 21/008
See application file for complete search history.

(56) References Cited

U.S. PATENT DOCUMENTS 6,648,485 B1    11/2003   Colgan et al.
2007/0047091 A1  3/2007   Spitzer et al.
(Continued)

OTHER PUBLICATIONS

International Search Report and Written Opinion for International Application PCT/US2020/044395, pp. 1-8. Mailing date of search report, Oct. 21, 2020.

*Primary Examiner* — Ryan D Howard
(74) *Attorney, Agent, or Firm* — Bond, Shoeneck & King, PLLC; George R. McGuire

(57) ABSTRACT

A light projection system includes an angle-dependent pattern projection device projecting light of multiple patterns into corresponding multiple directions, and a waveguide comprising an input and an output, configured to accept the light from the angle-dependent pattern projection device and emit the light through the output, whereby the light from each of the multiple patterns takes a unique path through the waveguide. The waveguide is built into a headset display device, and the output of the waveguide couples light emitted through the output to an eye.

25 Claims, 4 Drawing Sheets

(56) References Cited

U.S. PATENT DOCUMENTS

| | | |
|---|---|---|
| 2012/0092750 A1 | 4/2012 | Kroll et al. |
| 2015/0260994 A1 | 9/2015 | Akutsu et al. |
| 2015/0316767 A1* | 11/2015 | Ebstyne .................. G06T 7/80 345/8 |
| 2016/0231567 A1 | 8/2016 | Saarikko et al. |
| 2017/0139110 A1 | 5/2017 | Woodgate et al. |
| 2017/0329137 A1 | 11/2017 | Tervo |
| 2019/0094981 A1 | 3/2019 | Bradski et al. |

\* cited by examiner

WAVEGUIDE FOR ANGULAR SPACE LIGHT MODULATOR DISPLAY

CROSS-REFERENCE TO RELATED APPLICATION

This is a U.S. National Stage Application filed under 35 U.S.C. 371 based on International Patent Application No. PCT/US2020/44395, filed on Jul. 31, 2020, which relates and claims priority to United States Provisional Patent Application No. 62/880,730, Waveguide for Angular Space Light Modulator Display, Filed Jul. 31, 2019, the entirety of which is hereby incorporated by reference.

GOVERNMENT FUNDING

N/A

FIELD OF THE INVENTION

The present disclosure is directed generally to angular space light modulators (ASLM), and more particularly to a waveguide for an ASLM that can be used, for example, in a headset display.

BACKGROUND

Headset display devices available today are not sufficient for positive consumer experiences due to two major limitations: inadequate fields-of-view and bulky package sizes. These issues stem from the use of typical Spatial Light Modulators (SLM) which have several restrictive design requirements. Angle-dependent pattern projections have been used before for Augmented Reality, Virtual Reality, and 3D display applications, but the optics typically involve large packages (e.g., many large relays, mirrors, lens arrays, combiners, etc.). Furthermore, typical SLM-based (non-angle-dependent pattern projection) displays have used waveguides to reduce package sizes and to integrate into headset displays, but the fields-of-view are limited by traditional SLM designs.

Accordingly, there is a need in the art for integration of an ASLM display into a headset display to achieve very large fields-of-view in very compact packages.

SUMMARY

The present disclosure is directed to a waveguide for ASLM display. The present disclosure integrates the ASLM display into a headset display to achieve very large fields-of-view in very compact packages (e.g., no larger than typical glasses).

In general, the present invention contains two parts: (1) a waveguide designed such that each angle-dependent projected pattern from an ASLM (or other angle-dependent projection device or plane) takes a unique path for output pupil combining for very wide field-of-view, and (2) a concept integrating the waveguide into a headset system.

According to an aspect, a light projection system comprising an angle-dependent pattern projection device projecting light of multiple patterns into corresponding multiple directions, and a waveguide comprising an input and an output, configured to accept the light from the angle-dependent pattern projection device and emit the light through the output, whereby the light from each of the multiple patterns takes a unique path through the waveguide.

According to an embodiment, the angle-dependent pattern projection device comprises an array of micromirrors.

According to an embodiment, the corresponding multiple directions are diffraction order directions.

According to an embodiment, the array of micromirrors is illuminated by multiple illumination sources which correspond to the multiple patterns.

According to an embodiment, the angle-dependent pattern projection device is a spatial light modulator coupled to a lens array.

According to an embodiment, the angle-dependent pattern projection device is a beam steering element.

According to an embodiment, the waveguide is built into a headset display device, and the output of the waveguide couples light emitted through the output to an eye.

According to an embodiment, the output of the waveguide comprises a hologram.

According to an embodiment, the waveguide is tapered.

According to an embodiment, there is a coupling optic positioned between the angle-dependent pattern projection device and the waveguide.

According to an aspect, a headset display device comprising a lens, an angle-dependent pattern projection device projecting light of multiple patterns into corresponding multiple directions, and a waveguide comprising an input and an output, configured to accept the light from the angle-dependent pattern projection device and emit the light through the output, whereby the light from each of the multiple patterns takes a unique path through the waveguide.

According to an embodiment, the angle-dependent pattern projection device comprises an array of micromirrors.

According to an embodiment, the corresponding multiple directions are diffraction order directions.

According to an embodiment, the array of micromirrors is illuminated by multiple illumination sources which correspond to the multiple patterns.

According to an embodiment, the angle-dependent pattern projection device is a spatial light modulator coupled to a lens array.

According to an embodiment, the angle-dependent pattern projection device is a beam steering element.

According to an embodiment, the waveguide is built into a headset display device, and the output of the waveguide couples light emitted through the output to an eye.

According to an embodiment, the output of the waveguide comprises a hologram.

According to an embodiment, the waveguide is tapered.

According to an embodiment, the waveguide comprises the entire volume of the lens.

According to an embodiment, the lens comprises an air gap such that the waveguide comprises a less than a whole portion of the entire volume of the lens.

According to an embodiment, there is a coupling optic positioned between the angle-dependent pattern projection device and the waveguide.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a waveguide for ASLM display.

(1/2) Waveguide to Overlap Angle-Dependent Projection Pupils

Figure 1:
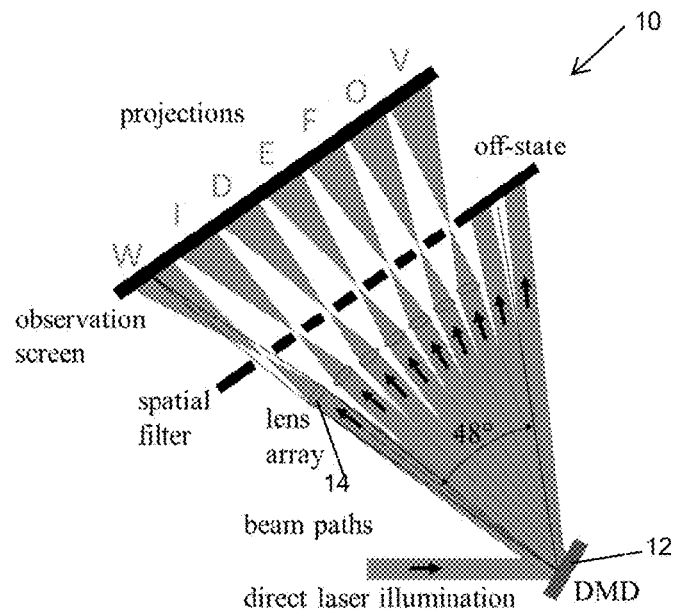
FIG. 1 is a schematic representation of an ASLM technique using a DMD to output different patterns (letters) into different directions, in accordance with an embodiment.
Figure 2:
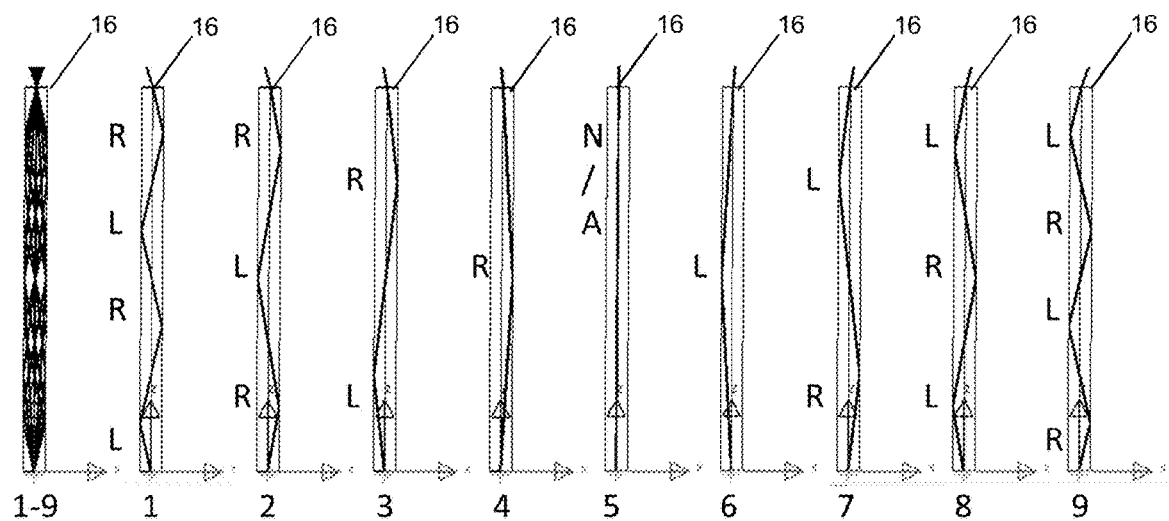
FIG. 2 is a schematic illustration of 9 unique projection paths through a waveguide, in accordance with an embodiment.

The result of the ASLM is an angle-dependent projection display 10: different patterns are projected into different directions from the same plane. For instance, FIG. 1 shows a single digital micromirror device (DMD) 12 projecting different letters, as large as the entire display area, into different directions. It would require large optics and lens arrays to combine the pupils of these different patterns beyond the plane of the DMD (e.g, the beams footprints at all 7 microlenses 14 would need to overlap). Instead, the output of the angle-dependent projection device 10 is coupled into a waveguide (this can be achieved with or without additional coupling optics, such as lenses or holograms, between the DMD and the waveguide). The angle-dependent pattern projection device 10 can comprise an array of micromirrors in which light can reflect upon. Other methods such as those incorporated in PCT/US2018/27620 and PCT/US2020/19251 can also be used. The ASLM waveguide 16 has a unique path for each angle-dependent pattern FIG. 2 shows unique light paths for 9 angle-dependent patterns projected from an angle-dependent pattern projection display (from bottom), and their reflection orders (shown as letters R or L for Right or Left) going up. In the 9 unique projection paths through a waveguide, pattern 1 is input from the bottom and reflects four times, left-right-left-right (LRLR) to the output (top). All nine paths are unique: LRLR, RLR, LR, R, N/A, L, RL, LRL, RLRL.

The result of the waveguide 16 is that the output pupils of all nine patterns overlap, allowing each pattern to be projected into a different part of the field-of-view. For instance, if each pattern covers 10 degrees of the field-of-view, the combined 9 patterns would have an approximate 90-degree field-of-view after the waveguide output.

Figure 3:
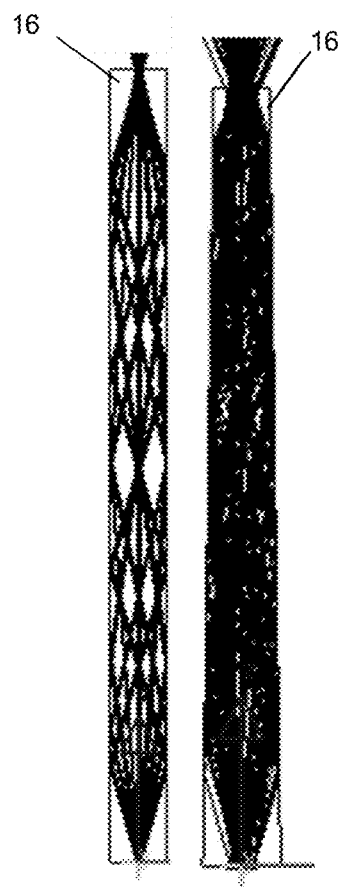
FIG. 3 is (left) 0.01 degree half-angle cone output from 9-angle output, and (right) 1 degree half-angle cone output from 9-angle output, in accordance with an embodiment.

The cone angles of each angle-dependent pattern outputs must be limited to prevent ghost reflections (e.g., a ghost reflection will occur if a part of a pupil from one angle-dependent pattern has an extra reflection). As shown in FIG. 3: (left) 0.01 degree half-angle cone output from 9-angle output, and (right) 1 degree half-angle cone output from 9-angle output. Both are small enough to prevent partial-pupil-reflections at the output surface.

Figure 4:
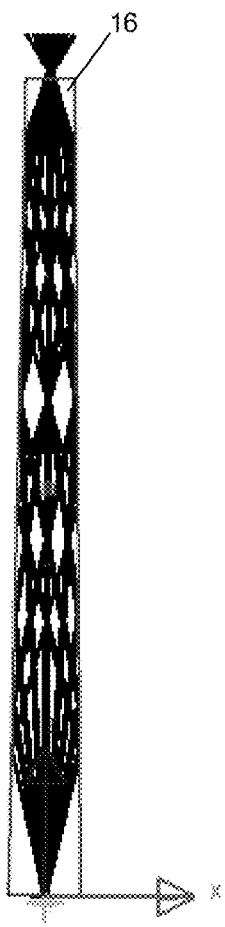
FIG. 4 is a schematic illustration of a tapered waveguide with angular magnification, in accordance with an embodiment.

The waveguide 16 can be tapered, with an output facet larger or smaller than the input facet, to add a magnification or demagnification component to the merged fields-of-view. This is shown in FIG. 4. A tapered waveguide 16 that increases the angular extent will decrease the spatial extent of the output pupil.

Figure 5:
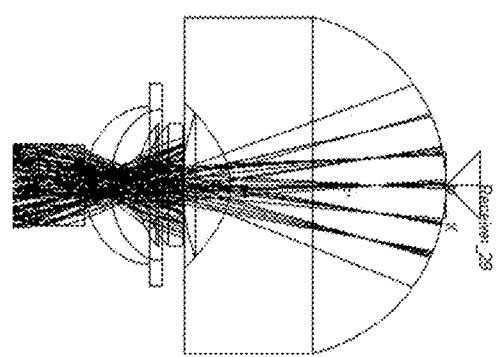
FIG. 5 is a schematic illustration of a waveguide (left) followed by a lens (for infinite object projection distance) followed by the Arizona Eye Model (right), in accordance with an embodiment.

The primary purpose of the waveguide 16 is to overlap the output pupils of the different angle-dependent patterns. The combined pupils allow the angular extent of each angle-dependent pattern to be combined laterally. This is demonstrated using the Arizona Eye Model (an optical model of the human eye, defined in *Field Guide to Visual and Ophthalmic Optics* by James Schwiegerling, SPIE Press, Bellingham, Washington, 2004, page 16) shown in FIG. 5. The limited pupil causes vignetting (restriction of rays passing) at steeper angles.

Figure 6:
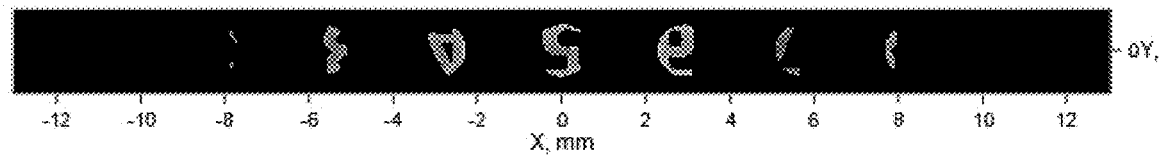
FIG. 6 is a schematic illustration of the output of the Arizona Eye Model shown by the spatial irradiance upon the retina, in accordance with an embodiment.

The output of the Arizona Eye Model, as shown in FIG. 6, is represented by the spatial irradiance upon the retina (right-most surface).

Figure 7:
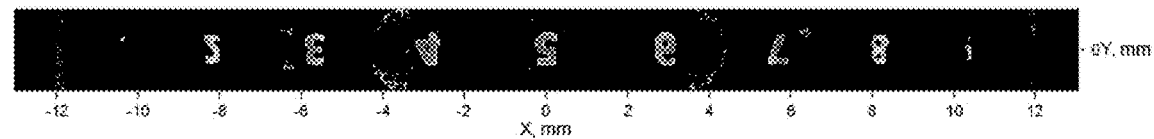
FIG. 7 is a schematic illustration of a retina capture from a larger pupil system, in accordance with an embodiment.

To view the entire field-of-view, the pupil size must be increased. A retina capture from a larger pupil system is shown in FIG. 7. (It is most practical to use a pupil expansion component (for example, the pupil expansion techniques proposed by Colton Bigler, Micah Mann, and Pierre-Alexandre Blanche in either "Holographic waveguide head-up display with 2-D pupil expansion and longitudinal image magnification," Applied Optics vol. 58, iss. 5, pp. A251-A257, 2019, or "Holographic waveguide HUD with in-line pupil expansion and 2D FOV expansion," Applied Optics, vol. 58, iss. 34, pp. G326-G331, 2019) for this, but FIG. 7 is captured from a scaled-up system with a larger pupil.)

Headset Display Using ASLM Waveguide

Figure 8:
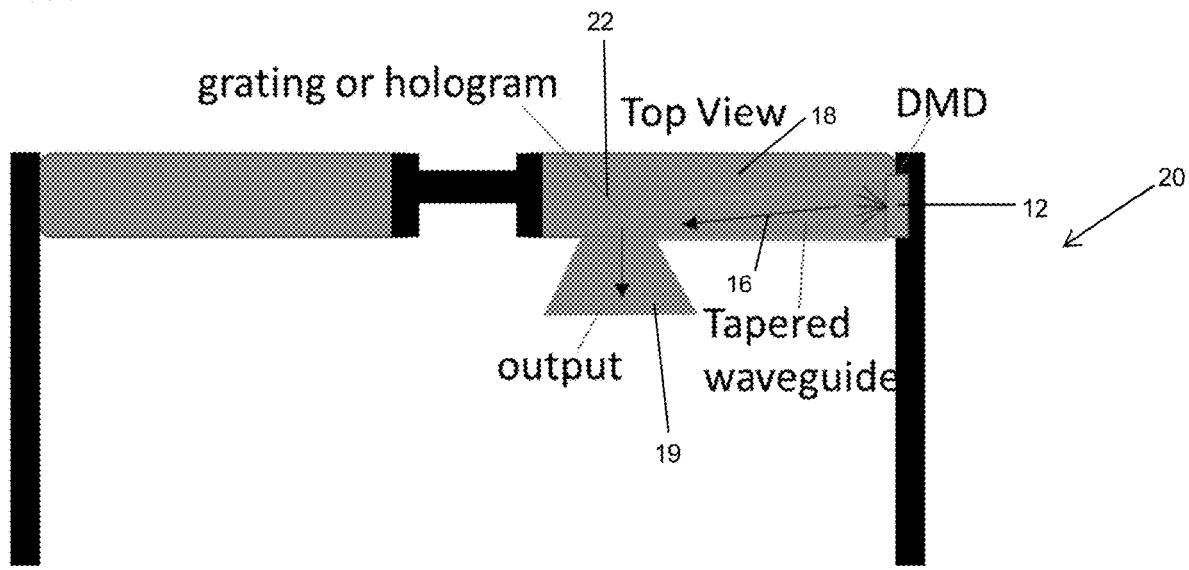
FIG. 8 is a block diagram of a headset display built into a pair of glasses, in accordance with an embodiment.

The display system 10 can be integrated into a headset 20 with a very small package size, for instance, as small as a typical pair of glasses. The concept is shown in FIG. 8 where the angle-dependent pattern projection device is a DMD 12 which projects multiple patterns into multiple directions. The waveguide 16 transfers the light down the length of the glass slab/lens 18. The output 19 is coupled by a grating or hologram 22 to the eye. The grating or hologram 22 may expand the pupil (e.g., by a second stage waveguide). The grating or hologram 22 at the output of the waveguide, or additional optics, such as lenses located between the DMD 12 and waveguide 16, may make the image distance appear further (i.e., the patterns projected into the eye appear to the eye to be further away than the physical distance between the eye and the DMD 12). The waveguide 16 may be created using the entire volume of glass, or by segmenting the glass, for instance by an air gap for total-internal-reflection (TIR) as shown in FIG. 8 which also shows the multiple horizontal angle-dependent pattern output directions out of the DMD 12 which are used to extend the horizontal field-of-view.

Figure 9:
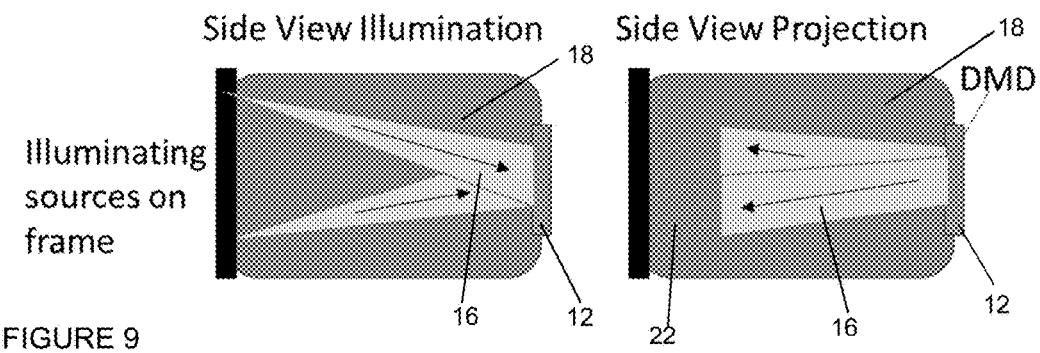
FIG. 9 is a schematic illustration of two illumination sources illuminating the DMD for angle-dependent patterns in the vertical dimension, in accordance with an embodiment.

An additional illumination source(s), such laser(s) or LED(s), may be required to illuminate the angle-dependent pattern display device, as in the case of the DMD 12. The illumination source(s) may be on the same side of the glass slab/waveguide 16 as the DMD 12, or the illumination source(s) may be on the other side of the glass 22, using the glass 22 as a waveguide 16 in the other direction. A side-view of this concept is shown in FIG. 9.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A light projection system comprising:
   a. an angle-dependent pattern projection device projecting light of multiple patterns into corresponding multiple directions, and
   b. a waveguide comprising an input and an output, configured to accept the light from the angle-dependent pattern projection device and emit the light through the output, wherein the angle-dependent pattern projection device is a spatial light modulator coupled to a lens array,
   c. whereby the light from each of the multiple patterns takes a unique path through the waveguide.

2. The system of claim 1, where the angle-dependent pattern projection device comprises an array of micromirrors.

3. The system of claim 2, where the corresponding multiple directions are diffraction order directions.

4. The system of claim 2, where the array of micromirrors is illuminated by multiple illumination sources which correspond to the multiple patterns.

5. The system of claim 1, where the angle-dependent pattern projection device is a beam steering element.

6. The system of claim 1, where the output of the waveguide comprises a hologram.

7. The system of claim 1, wherein the waveguide is tapered.

8. The system of claim 1, further comprising a coupling optic positioned between the angle-dependent pattern projection device and the waveguide.

9. A headset display device, comprising:
   a. a lens;
   b. an angle-dependent pattern projection device projecting light of multiple patterns into corresponding multiple directions, and
   c. a tapered waveguide comprising an input and an output, configured to accept the light from the angle-dependent pattern projection device and emit the light through the output through the lens,
   d. whereby the light from each of the multiple patterns takes a unique path through the waveguide.

10. The device of claim 9, where the angle-dependent pattern projection device comprises an array of micromirrors.

11. The device of claim 10, where the corresponding multiple directions are diffraction order directions.

12. The device of claim 10, where the array of micromirrors is illuminated by multiple illumination sources which correspond to the multiple patterns.

13. The device of claim 9, where the angle-dependent pattern projection device is a spatial light modulator coupled to a lens array.

14. The device of claim 9, where the angle-dependent pattern projection device is a beam steering element.

15. The device of claim 9, where the output of the waveguide comprises a hologram.

16. The device of claim 9, wherein the waveguide comprises the entire volume of the lens.

17. The device of claim 9, wherein the lens comprises an air gap such that the waveguide comprises a less than a whole portion of the entire volume of the lens.

18. The device of claim 9, further comprising a coupling optic positioned between the angle-dependent pattern projection device and the waveguide.

19. A light projection system comprising:
   a. an angle-dependent pattern projection device projecting light of multiple patterns into corresponding multiple directions, wherein the angle-dependent pattern projection device comprises an array of micromirrors, and the corresponding multiple directions are diffraction order directions, and
   b. a waveguide comprising an input and an output, configured to accept the light from the angle-dependent pattern projection device and emit the light through the output,
   c. whereby the light from each of the multiple patterns takes a unique path through the waveguide.

20. A light projection system comprising:
   a. an angle-dependent pattern projection device projecting light of multiple patterns into corresponding multiple directions, wherein the angle-dependent pattern projection device comprises an array of micromirrors, and
   b. a waveguide comprising an input and an output, configured to accept the light from the angle-dependent pattern projection device and emit the light through the output, wherein the angle-dependent pattern projection device comprises an array of micromirrors,
   c. whereby the light from each of the multiple patterns takes a unique path through the waveguide.

21. A light projection system comprising:
   a. an angle-dependent pattern projection device projecting light of multiple patterns into corresponding multiple directions, and b. a tapered waveguide comprising an input and an output, configured to accept the light from the angle-dependent pattern projection device and emit the light through the output, c. whereby the light from each of the multiple patterns takes a unique path through the waveguide.

22. A headset display device, comprising:

a. a lens;

b. an angle-dependent pattern projection device projecting light of multiple patterns into corresponding multiple directions, wherein the angle-dependent pattern projection device comprises an array of micromirrors, and the corresponding multiple directions are diffraction order directions, and c. a waveguide comprising an input and an output, configured to accept the light from the angle-dependent pattern projection device and emit the light through the output through the lens, d. whereby the light from each of the multiple patterns takes a unique path through the waveguide.

23. A headset display device, comprising:

a. a lens;

b. an angle-dependent pattern projection device projecting light of multiple patterns into corresponding multiple directions, wherein the angle-dependent pattern projection device comprises an array of micromirrors, and the array of micromirrors is illuminated by multiple illumination sources which correspond to the multiple patterns, and c. a waveguide comprising an input and an output, configured to accept the light from the angle-dependent pattern projection device and emit the light through the output through the lens, d. whereby the light from each of the multiple patterns takes a unique path through the waveguide.

24. A headset display device, comprising:

a. a lens;

b. an angle-dependent pattern projection device projecting light of multiple patterns into corresponding multiple directions, and c. a waveguide comprising an input and an output, configured to accept the light from the angle-dependent pattern projection device and emit the light through the output through the lens, wherein the waveguide comprises the entire volume of the lens, d. whereby the light from each of the multiple patterns takes a unique path through the waveguide.

25. A headset display device, comprising:

a. a lens;

b. an angle-dependent pattern projection device projecting light of multiple patterns into corresponding multiple directions, and c. a waveguide comprising an input and an output, configured to accept the light from the angle-dependent pattern projection device and emit the light through the output through the lens, wherein the lens comprises an air gap such that the waveguide comprises a less than a whole portion of the entire volume of the lens, d. whereby the light from each of the multiple patterns takes a unique path through the waveguide.

* * * * *